Patented Sept. 14, 1937

2,092,754

UNITED STATES PATENT OFFICE 2,092,754

CATALYTICALLY-HARDENING MOLDING COMPOSITIONS

Carleton Ellis, Montclair, N. J., assignor to Ellis-Foster Company, a corporation of New Jersey No Drawing. Application April 15, 1931,
Serial No. 530,423

6 Claims. (Cl. 106—22)

The present application, which continues subject matter from application Serial No. 689,165, filed January 28, 1924, is directed to the production of hardened urea formaldehyde type molding compositions and molded or cast products in which the reaction materials are subjected to reaction conditions in the initial stages in which the hydrogen ion concentration of the medium is insufficient, appropriately for the particular utilization, to secure the conversion to the later stages of condensation which is obtained in the presence of an accelerating agent, either inorganic or organic, or both, preferably including rather strong acid materials, as for example by the treatment of such initial condensation products in a more strongly acid medium to secure the final stage of condensation desired, particularly when hardening by heat is utilized. The initial reaction of the materials to form the initial condensation products may, therefore, take place in a medium which is either distinctly alkaline, or neutral, or of such mild acidity, that only the initial or intermediate types of condensation products are obtained. The initial condensation products thus obtained may then be subjected to reaction through the hardening stages by the addition of an acid catalyst, either an inorganic or an organic acid, or acid reacting substance, suitable for the purpose.

This invention relates to certain synthetic products of use in the arts made from urea by reaction with other materials as will be hereinafter described and relates particularly to products which may be cast, molded, machined or otherwise treated to make shaped articles and also to varnishes, lacquers, paints and enamels containing such synthetic products. It is especially an object of the invention to obtain light colored articles or materials which are not readily discolored by light or heat.

This invention is concerned with the reaction products of urea or equivalent substance with formaldehyde or equivalent substance and an acid body or in some cases an alkaline or basic substance followed by an acid body.

Methylol urea may be used alone or in conjunction with various natural or synthetic resins or resin-forming substances, with or without fillers or extending and coloring agents.

Either the monomethylol urea or the dimethylol urea may be used singly or in admixture or their appropriate derivatives may be utilized, e. g., substituted ureas acting in a similar or equivalent manner. The term urea is employed here to embrace carbamide and appropriate derivatives.

Thus dimethylol urea or mixtures of this substance with some monomethylol urea are preferred. When dimethylol urea is heated it melts somewhere in the neighborhood of 120° C. but on further heating for example 20 or 30 degrees higher reaction takes place and a substance is formed which is quite infusible at the temperature at which it is produced and may be heated to a considerably higher temperature before softening or carbonization occurs. For example it may be heated nearly 100 degrees above its hardening point before it begins to show signs of decomposition. This property of heat-setting or becoming thermo-rigid makes possible the use of the material in or as a basis of molding compounds which under heat and pressure become solidified or consolidated to a shaped mass. Molded articles may be obtained which are firm, strong and more or less heat resistant.

In the molding field there is desired not necessarily a perfectly infusible resin or binder but one which on solidifying at the molding temperature is sufficiently firm at that temperature to be removed from the molding press while still hot and be handled and exposed without deformation or loss of surface lustre. The labor cost in molding is so great that the few minutes' time required to cool the mold in the production of plastics from fusible resins which do not harden or become thermo-rigid represents a considerable item in the total cost of manufacture. Hence the desirability of a resin not necessarily infusible but which will sufficiently harden in the mold at the molding temperature.

Dimethylol urea is suitable for this purpose on account of its hardening property, the differential or spread in temperature between the melting point and the point at which it decomposes under strong heating is sufficiently great that even though not wholly infusible it is capable of meeting the demand for a labor-saving molding compound of this general character.

It is not necessary to employ pure dimethylol urea but the crude substance, contaminated with various other bodies, may be used in many cases. It is however desirable to heat the crude dimethylol urea for a period to thoroughly dry it and remove as far as possible any substances which might evolve gases in the mold. Thus dimethylol urea was baked 18 hours at 120° C. A white product was obtained which was placed in a mold in powdered form and molded at 300° F. under a pressure of 1000 pounds and higher. A white solid article was obtained which had a glossy surface and which when placed in a Bunsen flame did not melt but burned slowly with carbonization.

Desirable combinations may be made with various synthetic resins as for example by incorporation with a fusible phenol formaldehyde resin. Such a mixture on heating in the mold yields a heat-resisting urea compound. A product of this character will set sufficiently in hot pressing to be useful in molding operations. The reaction is a complex one, the urea compound probably forming the substance $C_5H_{10}N_4O_3$ in part and also probably reacting with the phenol formaldehyde product to a certain extent. In place of phenol, cresol, naphthol and other reactive bodies are not excluded. Acetaldehyde also may be used with, or in some cases in substitution for, formaldehyde.

Still another composition is that made by reacting on furfural with aniline hydrochloride. For example, 1 part of aniline hydrochloride is dissolved in 2½ parts of furfural and is very gently heated and incorporated with dimethylol urea. Care should be taken to avoid any increase of the temperature which forms an infusible compound permaturely. This is due to the fact that bodies of the aniline hydrochloride type tend to liberate acid on heating and therefore hardening may set in prematurely unless the temperature is kept at a low point during the incorporation with dimethylol urea. Subsequently, of course, the presence of such a catalyst is useful in liberating acid and accelerating the hardening in the mold.

Still another composition is that involving a mixture of dimethylol urea and monomethylol urea incorporated in various proportions as, for example, equal parts by weight. While this material may be used by itself for molding purposes it may also be admixed with the fusible phenol formaldehyde resin for example as above described or with a furfural phenol resin or a furfural aniline resin. The proportions used being for example equal parts or compositions containing more of one constituent than the other.

Dimethylol urea also may be incorporated with phenol sulphur resins made by reacting on phenol with sulphur chloride. For example, 1 part by weight of phenol is treated with 2 to 2¼ parts of sulphur monochloride to yield a resin as described in my prior application pending.

This resin may be incorporated with 10 per cent and upwards of dimethylol urea.

Various fillers or extending agents as indicated may be employed for example, mineral fillers, gypsum, whiting, mica, infusorial earth, clay and asbestos or organic fillers such as cotton flock, wood pulp, saw dust, wood flour, cork, leather scrap, etc.

Molding compounds may be made by mixing such fillers as for example equal parts of filler and binder to form molding powders. The filler may be simply ground with the binder or may be impregnated by means of a solution; or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Shaped articles made under heat and pressure in accordance with the foregoing may be defined or characterized by containing a heat-set urea derivative.

The following subject matter relates especially to the use of organic acids in lieu of mineral acids for carrying out the reaction. In the foregoing I have mentioned the use of dibasic acids such as oxalic acid in carrying out the reaction. The employment of other acids such as lactic, succinic, tartaric, citric, malic and other acids in the aliphatic series, and benzoic, salicylic, acetyl salicylic, phthalic acid and the like in the aromatic series and their corresponding anhydrides is feasible.

The description which follows is especially concerned with phthalic acid or anhydride.

When urea, phthalic anhydride and aqueous formaldehyde are mixed and heated in an open flask a milky liquid at first appears but on continued heating, preferably by boiling, the solution gradually clarifies and a thin transparent syrup is formed which on cooling becomes heavy bodied. Fifteen minutes to one hour boiling usually suffices to bring about this conversion. The heavy bodied syrup thus obtained will on long standing sometimes, for example in a few days' time, show some separation of a whitish solid substance.

The syrup obtained in this way has the curious property of being soluble in or miscible with organic solvents such as methyl or ethyl alcohol or better with a ketone such as acetone. This solubility or miscibility has certain limits as too great an addition of for example acetone will give a white precipitate. Also if diluted with water a white precipitate will form in some cases when a certain dilution is reached.

For ordinary purposes the syrup may be diluted with an equal volume of acetone. This provides a solution which may be used as a varnish or impregnating medium. A coating of this material slowly hardens on exposure to air and much quicker on baking. Thus the solution may be applied to metal surfaces and the articles baked in order to produce a hard transparent coating.

When urea and formaldehyde are caused to react without an acid, as for example by simply heating together, a product is obtained which is very quickly discolored at high temperatures. The same is true when urea and formaldehyde are caused to react in the presence of a base, such as an alkali or hexamethylenetetramine. Such products seem to be rather sensitive to heat at temperatures above 100° and tend to turn yellow or brown. In attempting to mold such products discoloration is likely to occur. With the phthalic product a marked resistance to discoloration by heating is noted. This is important in making white articles which retain their color on baking or molding in a hot press.

(A) A preferred mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However suitable arrangements may be made such as an ordinary condenser (not refluxing) to collect any distillate and recover formaldehyde. In some cases the heating may be carried out in an autoclave under pressures above atmospheric.

(B) Another mixture is made by heating 50 parts each of urea and phthalic anhydride and 150 parts of aqueous formaldehyde. This product is not as readily miscible with acetone.

(C) Another product was obtained by heating 10 parts of urea, 20 parts of phthalic anhydride and 60 parts of aqueous formaldehyde. This product is somewhat more miscible with acetone than in the case of (B) and has slightly better keeping qualities.

(D) 20 parts of urea, 10 parts phthalic anhydride and 60 parts of aqueous formaldehyde were mixed and boiled with the object of producing a clear solution but only a milky syrup could be obtained. This product was less readily incorporated with acetone.

(E) 20 parts urea, 50 parts phthalic anhydride and 50 parts aqueous formaldehyde were boiled together. When hot a pasty white product resulted which thickened somewhat on cooling.

A thick layer of syrup (A) was dried at 50° C. until the material could be removed from the drying pan and cut into various shapes such as strips, cubes and the like. These articles when air dried for 3 or 4 weeks were found to be clear and glass-like. Sheets or material made in this way, or by longer baking if desired, may be used as substitutes for window glass in making wind shields. The material may be ground to form lenses for eye glasses or optical instruments. Sheets of the material also may be used in making goggles. Longer baking, especially with gradually increasing temperature, keeping at all times below the temperature at which bubbles or fissures due to expansion of moisture or gases form yields products more resistant to water, solvents and the like.

Thus for making transparent articles adapted as substitutes for those various uses for which glass is now employed slow drying or baking is preferred to bring about the conversion to a heat-resistant insoluble product. On the other hand the product is very sensitive to higher temperatures when in the initial syrupy or soluble form and may be very quickly transformed into an infusible product by heating to 110-130° C. without discoloration. This enables various molding compositions and molded articles to be obtained as will be subsequently described.

Clear glass-like material also has been obtained by vacuum drying up to a temperature of 90° C. An infusible product may be obtained in this manner.

Aqueous solutions generally tend to thicken and set to a solid pasty mass in the course of time. When thinned with acetone however the solutions show a much greater permanency which is desirable for many applications.

Acetone will mix in the cold with a syrup such as is obtained according to example (A). Alcohol however does not mix as well and it is better to add this solvent to the freshly prepared warm syrup. In this way a solution is obtained which on cooling does not show separation at least for some time.

The phthalic-urea complex made in this way when not baked or exposed to any high degree of heat is soluble in furfural. It is also soluble in phenol. The latter will dissolve even the baked material in many cases. A solution of the well dried resinous complex may be dissolved in furfural and a solution of nitrocellulose and acetone admixed with it to give a clear product.

Various tests were made with the syrupy material such as described in example (A) as a binder for the customary fillers employed in the plastic molding art with the object of producing molded articles which were heat resistant. Thus 50 parts by weight of syrup (A) were mixed with 100 parts of asbestos fibre and dried in a vacuum to 90° C., then ground and pressed for 10 minutes in a hydraulic press at 110° C. An infusible heat-resistant molded article was obtained having a good glossy surface, slightly gray in color due to the asbestos employed.

In another case equal parts of syrup (A) and wood flour were well mixed and dried in a vacuum drier up to 75° C. When placed in the hot press and molded at 110° C. the molded article was found to be unsatisfactory because of what is termed overcuring. Another mixture in the same proportions was dried up to 50° C. in a vacuum drier until the moisture was removed and then ground. Finally it was air-dried for 4 hours. On pressing in a hydraulic press at 110° C. for 10 minutes, pressure of 3000 pounds, a light yellow translucent hard tough molded article was obtained.

No mold lubricant was required. The molded article leaving the hot mold freely without sticking. A temperature of 110° C. is a relatively low one for molding purposes and was used in the present case in order to give as favorable results as possible in regard to light color. The temperature of molding may, however, be increased with consequent increase in speed of setting or curing in the mold to produce an infusible article which may be taken from the mold without necessity of cooling.

In addition to phthalic anhydride or phthalic acid, other organic acids, both monobasic and polybasic may be used, including acids of both aliphatic and aromatic series and the following illustrates the results obtained with a series of such acids.

In the following series the acid is used in the proportion of 1 part by weight to 1 part of urea and 4 parts of aqueous formaldehyde of 40 per cent strength. The data first indicates the results obtained on boiling the ingredients together for 5 minutes and also the setting or hardening effect produced by heating a portion of each of the samples under like conditions on a hot plate to determine the comparative rate of setting and make observations on any discoloration brought about by the action of heat.

(1) *Gallic acid.*—On heating the ingredients together a clear thick syrupy solution formed which on cooling became clouded and slightly yellowish. A hard glossy yellowish resin was obtained by heating on the hot plate.

(2) *Salicylic acid.*—A water white syrup with some white crystalline matter results. When this product is heated on the hot plate a tough snow white resin readily forms.

(3) *Acetyl salicylic acid.*—On heating the ingredients a very thick syrup formed which could be changed to a transparent jelly. This reacted very quickly on the hot plate to produce a clear transparent resin. The rate of hardening or curing is notably rapid.

Among the uses for the product of the present invention is in the varnish, lacquer, paint and enamel industry, as an impregnating material, for hat stiffening and as a cement. It may be used in substitution for glass for various purposes such as lenses, wind shields, revolving doors, etc. In making imitation gems, beads, cigarette and cigar holders, pipe stems, umbrella and cane handles, fountain pens, billiard balls, ash trays, phonograph records, camera parts, grinding wheels, gears, artificial amber, insulation, white or light colored molded articles, buttons, ink stands, ornamental articles, dishes, etc. It may be reinforced by the use of appropriate wire netting or by sheets of paper or cloth; or articles may be built up of impregnated sheets of fibrous material pressed together in a hot press.

"Non-breakable" glass may be formed by cementing two panes of glass together by the ureaphthalic derivative. Careful baking to avoid bubbles serves to harden the cementing agent.

The material of the present invention may be mixed with other substances such as resins, nitrocellulose, or other cellulose esters or ethers, with shellac solutions, either aqueous or alkaline, and the like.

The syrupy material may be poured out in pans and allowed to set and harden preferably baking at 50 to 60° C. thereby obtaining sheeted material which may be stamped into the form of dishes, ash trays, parts of toys, and the like.

The present invention, which continues subject matter from application Serial 689,165, as aforesaid, is accordingly directed more particularly to the final hardening treatment by heat and/or pressure of fusible urea formaldehyde condensation products under the action or stimulus of an accelerating agent or catalyst of hardening, preferably one possessing an acid character, or capable of creating acid conditions. When the object is to make a shaped resinous product or article, as for example, by casting or otherwise molding, as for example by hot pressing, the acidity required for producing such final hardening may be obtained, as indicated, by direct addition of acids, either mineral or organic, to the fusible initial condensation products, or by the inclusion of active substances such as acetyl salicylic acid, and the like, or the aniline hydrochloride combinations disclosed herein, which do not under the conditions initially (or at some intermediate stage) prevailing, yield the desired or optimum acidity that would cause the desired final condensation reaction to progress to adequate completion with suitable or appropriate speed, such as may be required, but which under the action of heat such as the heat used in molding or casting operations or baking treatment, any of which may be carried out under pressure, decompose such combinations and increase the hydrogen ion concentration, and thus yield an acidity highly useful in such hardening or other final reaction stages of the urea formaldehyde condensation.

In making the foregoing initial product the proportion of 2 moles formaldehyde to 1 mole urea preferably is not exceeded. In fact, preferably in practice I employ a lower ratio, usually about 1½ moles formaldehyde to 1 mole urea as has been indicated in the foregoing. To the initial product obtained in accordance with these proportions there is added an accelerating catalyst such as a halogen acid or substances liberating a halogen acid e. g. hydrochloric acid from aniline hydrochloride combinations mentioned. Moreover, since it is cheaper to use aqueous formaldehyde than the anhydrous grade water generally has to be removed from the initial condensation product and I have pointed out that the drying of this initial condensation product should be carefully conducted as, for example, by vacuum drying preferably at temperatures below 90° C. and frequently at temperatures of 50° to 75° C., especially when a vacuum is not used, thereby obtaining the initial condensation product in a state of suitable fusibility readily adapted to flow in a suitable mold when heat and/or pressure is applied. Further it may be stated that the employment of a hardening catalyst active during the final stages of condensation as aforesaid preferably is one which is particularly active within a molding temperature range of say, 125° to 150° C. Urea formaldehyde resins are liable, when heated above 150° C. to decompose, disadvantageously yielding brittle or spongy products which are unsuited for many applications. A molding range therefore sufficiently above 100° C. to obtain a quick melting or softening of the molding composition in the mold but not so high as to cause the "burning" of the composition is preferably employed. A catalyst liberating acid or becoming more acid when heated to a temperature within this range, particularly between a temperature of 125–150° C., therefore is most suitable. The aniline hydrochloride combination referred to above has been found to be quite active at 128° C., at which temperature hydrochloric acid is evolved rather freely. Acetyl salicylic acid breaks down in the presence of the residual moisture of the molding composition or that which is liberated by reaction giving both acetic and salicylic acid, thereby producing two acids from a single very mild acid and hence catalyzing the final hardening stage: by which term is meant the formation from the fusible or readily-flowable resin of a more heat-resistant product which is likewise notably resistant to the action of ordinary volatile solvents.

What I claim is:

1. A composition of matter adapted to be converted by heat to substantially insoluble condition, said composition comprising a mixture of: a urea-aldehyde condensation product; and a compound adapted to combine chemically therewith under the action of heat to form a substantially insoluble product, said compound being selected from a group consisting of salicylic acid, acetyl salicylic acid, and gallic acid.

2. A composition of matter adapted to be converted by heat to substantially insoluble condition, said composition comprising a mixture of: an aqueous solution of a urea-aldehyde condensation product; a solvent comprising a plurality of low surface tension organic solvents having substantially different boiling points, and a compound adapted to be combined chemically with said condensation product to form a substantially insoluble final product, said compound being selected from the group consisting of salicylic acid, acetyl salicylic acid, and gallic acid.

3. A composition of matter which is convertible by heat to substantially insoluble condition, comprising a mixture of an aqueous aliphatic aldehyde solution of urea-aldehyde condensation product; a natural resin; a compound adapted to be combined under the action of heat with said condensation product to form a final substantially insoluble product, said compound being selected from a group consisting of salicylic acid, acetyl salicylic acid, and gallic acid; and a common solvent for the materials mentioned taken in sufficient proportions to produce a clear lacquer, said common solvent comprising an organic solvent having a high boiling point.

4. A composition of matter which is convertible by heat to substantially insoluble condition, comprising a mixture of an aqueous aliphatic aldehyde solution of urea-aldehyde condensation product; a natural resin; a cellulose ester; a compound adapted to combine under the action of heat with said condensation product to form a final substantially insoluble product, said compound being selected from a group consisting of salicylic acid, acetyl salicylic acid, and gallic acid; and a common solvent for the materials mentioned taken in proportions to produce a clear solution, said solvent comprising a mixture of low surface tension organic solvents having substantially different boiling points, including a high boiling point solvent.

5. A composition including a fusible condensation product of the urea-formaldehyde type containing aniline hydrochloride capable of liberating hydrochloric acid within the molding temperature range of the condensation product.

6. A composition including a fusible condensation product of the urea-formaldehyde type containing acetyl salicylic acid capable of liberating acid within the molding temperature range of the condensation product.

CARLETON ELLIS.